(12) United States Patent
Rolong et al.

(10) Patent No.: US 9,771,788 B2
(45) Date of Patent: Sep. 26, 2017

(54) STICTION CONTROL

(71) Applicant: Canrig Drilling Technology Ltd., Houston, TX (US)

(72) Inventors: Carlos Rolong, Houston, TX (US); Mahmoud Hadi, Richmond, TX (US)

(73) Assignee: Canrig Drilling Technology Ltd., Houston, TX (US)

( * ) Notice: Subject to any disclaimer, the term of this patent is extended or adjusted under 35 U.S.C. 154(b) by 283 days.

(21) Appl. No.: 14/665,419

(22) Filed: Mar. 23, 2015

(65) Prior Publication Data

US 2015/0275647 A1 Oct. 1, 2015

Related U.S. Application Data

(60) Provisional application No. 61/970,111, filed on Mar. 25, 2014.

(51) Int. Cl.
*E21B 44/02* (2006.01)
*G05B 15/02* (2006.01)

(52) U.S. Cl.
CPC ............. *E21B 44/02* (2013.01); *G05B 15/02* (2013.01)

(58) Field of Classification Search
CPC .......... E21B 44/00; E21B 44/02; E21B 44/08; G05B 15/02
See application file for complete search history.

(56) References Cited

U.S. PATENT DOCUMENTS

| | | | |
|---|---|---|---|
| 3,562,620 A | | 2/1971 | Haslehurst |
| 5,713,422 A | * | 2/1998 | Dhindsa ................. E21B 44/00 173/4 |
| 6,021,377 A | | 2/2000 | Dubinsky et al. |
| 6,029,951 A | | 2/2000 | Guggari |
| 6,662,110 B1 | * | 12/2003 | Bargach ................. E21B 44/00 175/45 |
| 7,026,950 B2 | | 4/2006 | Guggari et al. |
| 7,264,055 B2 | | 9/2007 | Mody et al. |
| 7,588,099 B2 | | 9/2009 | Kracik |
| 7,797,082 B2 | | 9/2010 | Srinivasan et al. |
| 8,145,328 B2 | | 3/2012 | Choudhury et al. |
| 8,352,048 B2 | | 1/2013 | Kresse |
| 2003/0132006 A1 | | 7/2003 | Bussear et al. |
| 2004/0217879 A1 | | 11/2004 | Guggari et al. |
| 2007/0288103 A1 | | 12/2007 | Choudhury et al. |
| 2009/0090555 A1 | * | 4/2009 | Boone ...................... E21B 44/02 175/45 |
| 2010/0237306 A1 | | 9/2010 | Eschelbacher et al. |
| 2014/0166363 A1 | * | 6/2014 | Haci ....................... E21B 44/00 175/24 |

FOREIGN PATENT DOCUMENTS

WO 2013/000094 A1 1/2013

* cited by examiner

*Primary Examiner* — Brad Harcourt
(74) *Attorney, Agent, or Firm* — Enrique Abarca; Abel Law Group, LLP (57) ABSTRACT

A system for use in subterranean operations comprising a drill string positioned within a wellbore, a sensor adapted to sense a physical parameter in relation to the drill string and generate a signal representing the physical parameter, and a control member adapted to affect subterranean longitudinal movement of the drill string in a predetermined longitudinal sequence of increments within the wellbore in response to the signal.

20 Claims, 5 Drawing Sheets

STICTION CONTROL

CROSS-REFERENCE TO RELATED APPLICATION(S)

This application claims priority under 35 U.S.C. §119(e) to U.S. Patent Application No. 61/970,111, entitled "STICTION CONTROL," by Carlos Rolong and Mahmoud Hadi, filed Mar. 25, 2014, which is assigned to the current assignee hereof and incorporated herein by reference in its entirety.

FIELD OF THE DISCLOSURE

The present invention relates generally to drilling wellbores through subsurface formations, and more particularly to a method and a system for reducing overshoot of a drill string associated with the transition from a static frictional regime to a dynamic frictional regime.

RELATED ART

Drilling subterranean wells for oil and gas is expensive and time consuming. Formations containing oil and gas are typically located thousands of feet below the earth's surface. Therefore, to access the oil and gas, thousands of feet of rock and other geological formations must be drilled. The costs associated with drilling are primarily time dependent. Accordingly, the faster the desired penetration depth is achieved, the lower the cost for drilling the well. Any downtime of the drilling operation results in a more expensive and less successful operation.

One frequent cause of downtime is a damaged drill bit or damaged sections of drill pipe. While both drill bits and sections of drill pipe are designed for extended use and rugged subterranean operation, acute forces, such as, for example, those encountered when a drill bit accidently hits the bottom of the wellbore, can shorten operational life resulting in extensive drilling downtime.

During drilling operations, the drill string can be weighted so as to optimize the rate of penetration (ROP) into the geological formation. ROP generally increases as the weight on bit (WOB) increases. For a given wellbore, a particular WOB exists that will determine a maximum ROP for the drilling operation. For example, ROP may depend upon the geological composition of the formation being drilled, the geometry and material of the drill bit, the rotational speed of the drill bit, the torque applied to the drill bit, and the pressure and rate of flow of drilling fluids in and out of the wellbore.

As the depth of the wellbore increases, the forces acting on the drill string can become more pronounced and the ROP can be affected. One particular force of concern during subterranean drilling is the force of friction resulting from relative movement (or lack thereof) between the inner surface of the wellbore and the outer surface of the drill string.

Specifically, when a drilling operation is paused, the drill string can become adhered to, or absorbed into, at least a portion of the inner surface of the wellbore. This is particularly common during non-vertical drilling operations when a greater weight of the drill string rests against a finite surface of the wellbore. This is a result of static friction, or "stiction."

Generally, there are two types of friction associated with drilling—static friction and dynamic friction. The forces required to overcome static friction are typically greater than that necessary to affect continued relative movement of the drill string against the force of dynamic friction. Therefore, to break out of a static frictional regime, a force applied to the drill string must be in excess of that required to maintain relative movement of the drill string. As a result, switching from a static to dynamic frictional regime can result in a sudden movement, or "jerking," of the drill string within the wellbore.

This sudden jerking can cause the drill string to overshoot on a downhole control parameter (e.g., WOB, ROP, Differential Pressure). This can cause the drill bit to unexpectedly collide with the bottom of the wellbore and can damage the drill bit or the drill string, or worse yet, damage the drilling rig.

The industry continues to demand improvements in subterranean drilling operations.

BRIEF DESCRIPTION OF THE DRAWINGS

Embodiments are illustrated by way of example and are not limited in the accompanying figures.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the drilling arts.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

The concepts are better understood in view of the embodiments described below that illustrate and do not limit the scope of the present invention. The following description is directed to a downhole or surface drilling technique, and more particularly to a system and method that can reduce the downhole effects resulting from a transition from a static frictional regime to a dynamic frictional regime and the resulting overshoot that can occur.

Generally, subterranean drilling operations utilize a drill string constructed from thin-walled drill pipe segments screwed to one another. The lower sections of the drill string have generally larger wall thickness to sustain sufficient pressure, without buckling. As the drill string is lowered into the wellbore, additional pipe segments are required to maintain a surface connection between the drill string and the drilling rig. By adding additional pipe segments to the drill string, the surface contact between the drill string and the wellbore increases, which may result in more pronounced drill string forces. Specifically, dry frictional forces (i.e., static friction and dynamic friction), between the drill string and the wellbore can increase as the drill string becomes longer, resulting in greater overshoot of control parameters and jerking of the drill string during transition between static and dynamic frictional regimes.

Dry frictional forces are tangential forces exhibited typically by contacting surfaces in relative motion. Frictional forces develop both during the interval prior to impending relative movement and while relative movement takes place. Frictional forces always oppose the motion or impending motion which would occur if no friction were present.

Figure 1:
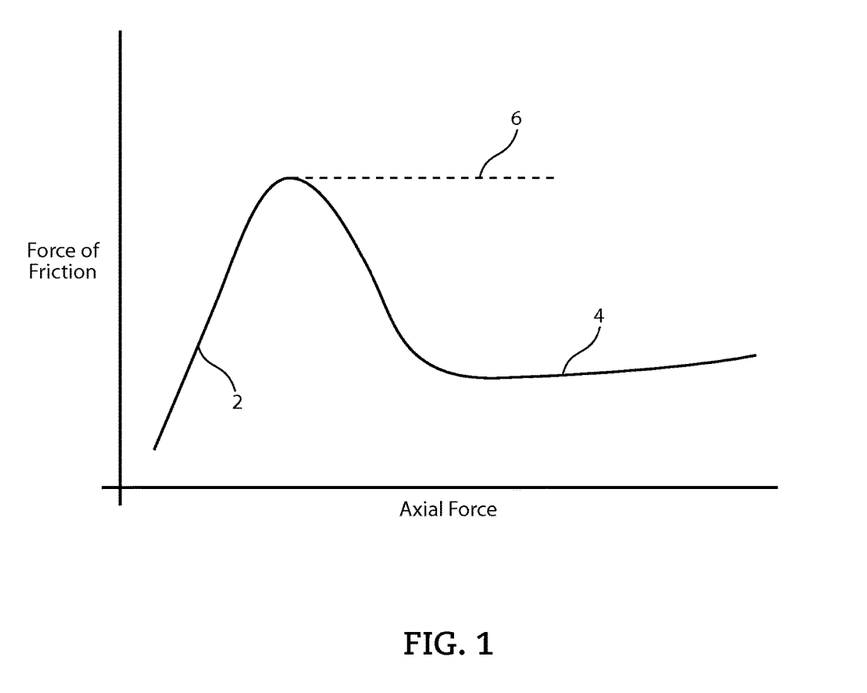
FIG. 1 includes a graph of frictional forces encountered during drilling.

Referring initially to FIG. 1, dry frictional forces can be divided into two basic types—static friction 2, or frictional forces exhibited prior to impending relative movement, and kinetic or dynamic frictional 4 exhibited after commencement of relative movement.

Frictional forces are generally calculated using the following equation:

$$F_f \leq \mu F_n.$$  Equation 1.

In Equation 1, $F_f$ is the force of friction exerted by contacting surfaces in relative motion with one another. $F_f$ is a force oriented in a direction parallel to the surface of the relative motion, and in a direction opposite to the net applied force. $\mu$ is the coefficient of friction—an empirical property defined by the qualitative characteristics of the contacting surfaces. $F_n$ is the normal force exerted by each surface on the other, and is directed perpendicular, or normal, to the contacting surfaces. The value of $F_f$ may take any value from zero up to $\mu F_n$. In the case of static friction, the frictional force, $F_{f_s}$ is equal to $\mu F_n$.

The normal force, $F_n$, is defined as the net force compressing two parallel surfaces together. The coefficient of friction, $\mu$, is a dimensionless scalar value describing the ratio of the force of friction between the two contacting surfaces. The coefficient of friction depends on the materials used and can range from near zero to greater than one. Generally, for surfaces at rest relative to each other, $\mu = \mu_s$, where $\mu_s$ is the coefficient of static friction. For surfaces in relative motion, $\mu = \mu_d$, where $\mu_d$ is the coefficient of dynamic friction. Almost always, $\mu_s$ is larger than $\mu_d$. In this regard, the force necessary to transition from a static friction regime to a dynamic friction regime is greater than the force necessary to maintain an object in a dynamic frictional regime.

Thus, to overcome the forces generated by a static friction regime, an overshooting force, or breakout force, as shown at line 6 may be applied to one of the objects. The overshooting force can generally be defined as the force necessary to begin relative movement between sliding objects. The overshooting force typically dissipates upon continued relative movement between the sliding objects. This is represented in FIG. 1 by the difference between the force exhibited at line 6 and the force exhibited by the dynamic frictional regime 4.

As the overshooting force increases relative to the force required to act against the dynamic frictional regime 4, the overshoot distance (the distance caused by a period of large acceleration) increases. This overshoot distance can be made greater by a large relative surface area contact between the objects (e.g., long sections of drill string within a wellbore). Thus, the effects of stiction are accentuated by drilling at greater depths (e.g., depths greater than 1,000 ft.).

As described above, for drilling operations, large overshoot distances can be detrimental. As such finding ways to minimize such overshoot distance may result in significant cost savings. Minimizing the overshoot distance in a drilling operation is an advantage of the present invention.

Figure 2:
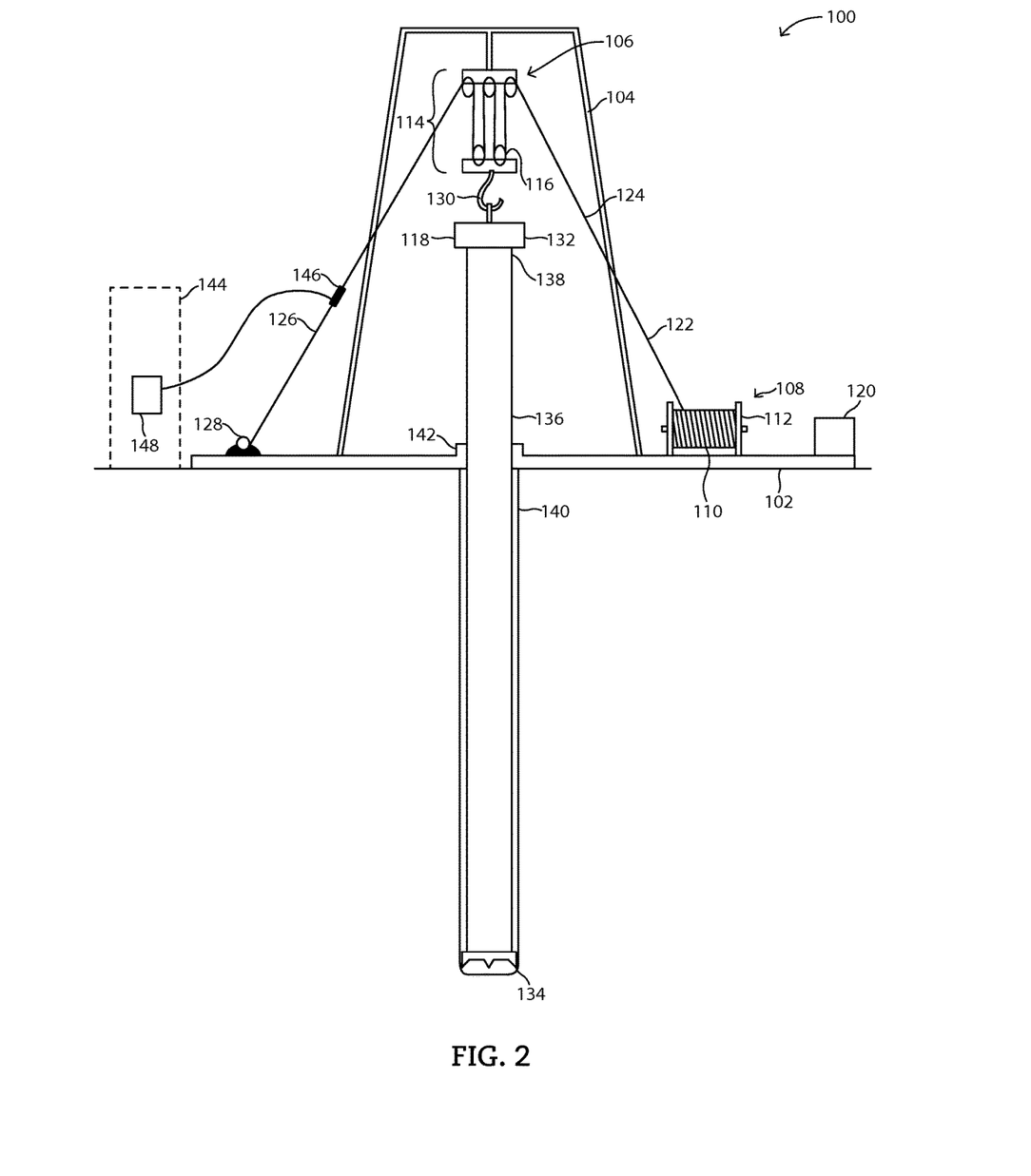
FIG. 2 includes a schematic cross-sectional view of a drilling rig in accordance with an embodiment.

Referring now to FIG. 2, a drilling rig 100 can generally include a substructure 102 and a derrick 104. The derrick 104 can be attached to the substructure and can extend therefrom. The derrick 104 can be a tower or a guyed mast such as a pole which is hinged at a bottom end. The derrick 104 and substructure 102 can be permanent or can be adapted to break down for transportation.

The drilling rig 100 can be an offshore drilling rig or a land based drilling rig. Offshore drilling rigs can take many forms. For example, the drilling rig 100 can have a fixed platform or substructure attached to an underlying seabed. Alternatively, the drilling rig 100 can have a floating platform resting at least partially underwater with an anchoring system holding the drilling rig 100 relatively near the underwater drilling operation. It should be understood that the particular configuration and embodiment of the drilling rig 100 are not intended to limit the scope of the present disclosure.

The drilling rig 100 can further include a hoisting system 106, a rotating system 118, and a power supply 120. The derrick 104 can support the hoisting system 106 and the rotating system 118 and can support a line system 122 engaged with the hoisting system 106.

The hoisting system 106 can further comprise a drawworks 108 and a block and tackle system 114. In particular embodiments, the drawworks 108 can comprise a drum 110 and a brake 112. The drum 110 can be generally cylindrical, having a length and a diameter, and can support at least a part of the line system 122 wrapped therearound. The drum 110 can rotate about a central axis positioned centrally along the diameter.

The drum 110 can be engaged with the brake 112 such that application of a force to the brake 112 can be transferred to the drum 110.

In particular embodiments, the drum 110 can be dynamically engaged with the brake 112. In such a manner, the brake 112 can have a transmitted force to the drum 110 that is not a 1:1 ratio. For example, the brake 112 can have a relative rotational speed with the drum 110 of between about 0.25:1.0 and about 1.0:0.25. In further embodiments, the drum 110 can be dynamically engaged with the brake with a relative rotational speed therebetween of between about 0.5:1 and about 1.0:05.

In yet further embodiments, the drum 110 can be statically engaged with the brake 112 with a relative rotational speed therebetween of about 1:1. In such a manner, the brake 112 can apply a direct force to the drum 110.

In a particular aspect, the drum 110 can be freely rotatable when the brake 112 is in a disengaged configuration, allowing line to can peel off (unwind) therefrom. In another aspect, the brake 112 can be engaged in a continuous manner to limit free rotation of the drum 110. In yet another aspect, the brake 112 can be intermittently engaged (pulsed).

Engagement of the brake 112 can be affected by any known method recognizable in the art. For example, the brake can include a brake lever (not shown) which can extend from a set of calipers (not shown) positioned along a braking surface of the brake 112. The brake lever can be mechanically linked to any linkage known within the art, such as, for example, via a brake band controller or a hydraulic/electric motor coupled thereto.

In particular embodiments, the line system 122 can extend from the drawworks 108 and can engage with a first end 138 of a drill string 136. In further embodiments, the line system 122 can extend from the drawworks 108 to a block and tackle system 114. In particular embodiments, the block and tackle system 114 can contain a plurality of sheaves 216. In this regard, the block and tackle system 114 can provide a mechanical advantage that is equal to the number of parts of the rope that support the drill string 136.

The drill string 136 can be suspended above a wellbore 140 by any combination of the above described components. For example, the drill string 136 can be suspended from the line system 122; the line system 122 can through the block and tackle system 114 and can engage with the drawworks 108. The drill string 136 can extend through the substructure 102 of the drilling rig 100 and pass through a rotatable table 142 in the substructure 102.

The above described assembly can further include a hook 130 attached to the end of the line system 122 engaging the drill string 136. In further embodiments, the hook 130 can attach to the rotating system 118. In such embodiments, the rotating system can comprise a top drive, providing the drill string 136 with rotational force. In other embodiments, the rotating system 118 can comprise a top drive 232. In other embodiments, the rotating system 118 can comprise a rotary table (not shown). The rotating system 118 can rotatably urge the drill string 136 at the surface of the wellbore 140 affecting subterranean rotation of the drill bit 134 at the bottom of the wellbore 140 where the drill bit 134 can impact the formation being drilled.

It should be understood that the particular configuration and embodiment of the drilling rig 100 are not intended to limit the scope of the present disclosure.

In particular embodiments, the relative position of the drill string 136 can be affected by movement of the drawworks 108. To lower the drill string 136 into the wellbore 140, the drawworks 108 can rotate, causing line from the line system 122 to peel off therefrom. Application of the brake 112 can slow or stop the drawworks 108 from peeling off line.

In particular embodiments, the drill string 136 can include a bottom hole assembly ("BHA") at a distal end. The BHA may include any one or more of stabilizers, weighted collars, formation measurement devices, downhole drilling motors, and a drill bit 134 connected at a distal end of the drill string 136. The drill bit 134 can comprise a hardened material, such as, for example, a tungsten carbide having synethic diamond attached thereto. The drill bit 134 can include a downhole sensor (not shown) or other similar device for determining dynamic weight on bit (WOB). It should be understood that the particular configuration and embodiment of the BHA are not intended to limit the scope of the present disclosure.

In particular embodiments, the drilling rig 100 can further include a control system 144 configured to sense and measure a physical drilling parameter, such as, for example, a downhole weight on bit (DWOB), a torque on bit (TOB), a stiction information, a relative position of the drill string 136, a relative position of the rotating system 118, or a relative position of the drawworks 108.

In particular embodiments the control system 144 can include a sensor, such as, for example, a rotary encoder, such as an absolute encoder or an incremental encoder. In certain embodiments, the sensor 146 can comprise a physical sensor, such as, for example, an accelerometer, a proximity sensor, a gyroscopic sensor, an piezoelectric sensor, a capacitive sensor, a position sensor, a rotary encoder, a tilt sensor, a rate sensor, a sonic sensor, or any combination thereof. In further embodiments, the sensor 146 can comprise an optical sensor such as an electro-optical sensor, an infrared sensor, an optical position sensor, a laser sensor, or any combination thereof. Moreover, the sensor 146 can comprise any other similar system known in the art for measuring the relative position of a physically moving or rotating object in a two- or three-dimensional spaces, such as, for example, a linear variable differential transformer.

In particular embodiments, the sensor 146 can sense and measure the relative position of the drill string 136, the rotating system 118, or the drawworks 108 and can sense physical changes to the orientation or position thereof. In this regard, the sensor 146 can sense a first physical parameter, $PP_1$, and a second physical parameter, $PP_2$. For example, the physical parameter may comprise the rotational position of the drawworks, the position of the drill string relative to the derrick, the position of the rotating system (top drive) relative to the derrick, or any combination thereof.

The sensor 146 may perform a measurement of the physical parameters several times per second, such as, for example, every 20 milliseconds, every 15 milliseconds, or even every 10 milliseconds.

Generally, during drilling operations the physical parameter will change between successive measurements by the sensor 146. For example, as the upper end of the drill string 136 translates in a direction towards the substructure 102 of the drill rig 100, the sensor 146 can measure two different relative positions thereof, a first physical parameter, $PP_1$, and a second physical parameter, $PP_2$. As a purely illustrative example, the sensor 146 may measure $PP_1$ as being 20 m (above the top surface of the substructure). A second measurement, $PP_2$, taken some time after $PP_1$, may be 19.95 m (above the top surface of the substructure). In this regard the drill string 136 can be said to have moved 0.05 m in the time between the two successive measurements.

In another example, $PP_1$ can be a relative rotational position of the drum 110. $PP_2$ can be a second relative rotational position of the drum. If the drum 110 had a PP1 of 20° and a $PP_2$ of 27°, it can be said that the drum rotated 7°. Using the dimensional characteristics of the drum and the known characteristics of the block and tackle system 114, the relative axial translation of the drill string 136 can be calculated.

In certain embodiments, $PP_1$ can be at least about 0.1 $PP_2$, at least about 0.2 $PP_2$, or even at least about 0.3 $PP_2$. In further embodiments, $PP_1$ can be no greater than about 100 $PP_2$, no greater than about 50 $PP_2$, no greater than about 10 $PP_2$, or even no greater than about 2 $PP_2$. Moreover, $PP_1$ can have a relationship with $PP_2$ that is within a range between and including any of the values described above, such as, for example, between about 5 $PP_2$ and about 8 $PP_2$.

It should be understood that the further the ratio of $PP_1:PP_2$ deviates from a 1:1 relationship, the greater ROP is increased. In particular embodiments, to affect a greater overshoot control (i.e., a lesser overshoot distance), the ratio of $PP_1:PP_2$ can be within a range of between about 1:0.7 and about 1:1.30. In more particular embodiments, $PP_1$ can be at least about 0.70 $PP_2$, at least about 0.75 $PP_2$, at least about 0.80 $PP_2$, at least about 0.85 $PP_2$, at least about 0.90 $PP_2$, at least about 0.95 $PP_2$, at least about 0.96 $PP_2$, at least about 0.97 $PP_2$, at least about 0.98 $PP_2$, at least about 0.99 $PP_2$. In further embodiments, $PP_1$ can be no greater than about 1.30 $PP_2$, no greater than about 1.25 $PP_2$, no greater than about 1.20 $PP_2$, no greater than about 1.15 $PP_2$, no greater than about 1.10 $PP_2$, no greater than about 1.05 $PP_2$, no greater than about 1.04 $PP_2$, no greater than about 1.03 $PP_2$, no greater than about 1.02 $PP_2$, no greater than about 1.01 $PP_2$. Moreover, $PP_1$ can have a relationship with $PP_2$ that is within a range between and including any of the vales described above, such as for example, between about 1.11 $PP_2$ and about 1.24 $PP_2$.

In particular embodiments, the control system 144 can further include a logic element 148. The sensor 146 can measure at least two of the physical parameters described above and communicate those measured physical parameters to the logic element 148.

The logic element 148 can differentiate the two measured physical parameters and affect a calculation expressing the change from the first physical parameter to the second physical parameter.

For example, in particular embodiments, to determine DWOB, the control system 144 can detect the static weight of the drill string 136, measure the axial and rotational friction coefficients of the drill string 136 within the wellbore 140, and determine downhole weight using axial friction coefficient and surface hook load measurements (i.e., the weight of the drill string as measured at the hoisting system). In other embodiments, DWOB can be estimated without use of any measurable data taken from the drilling rig 100 (e.g., using known variables and calculations from previous drilling operations). Moreover, calculations can be performed using finite element analysis, or difference methods.

The DWOB can also be determined as a surface weight on bit (WOB) from a hook load measurements taken at the hoisting system 106. From the WOB, the DWOB can then be estimated and effectively controlled. For example, to determine hook load, the drill string 136 can be connected to the drawworks 108 by the line system 122. The line system 122 can have a fast line 124 connected with the drawworks 108.

In further embodiments, the line system 122 can also have a dead line 126 connected to a deadline anchor or wheel 128. To measure the load applied on the hoisting system 106 by the drill string 136 a sensor 146 can be connected to the dead line 126. The sensor 146 can include a cantilevered flange mount tension sensor, a displacement gage, a strap tension meter, a hydraulic tension meter, or any other known device for calculating tension within a line. To determine hook load, the tension value as calculated by the sensor 146 can be multiplied by the number of drilling lines 217 between the sheaves 216 in the block and tackle system 114. The value obtained can then be augmented by calculating the characteristic properties within the wellbore 140 (e.g., frictional forces).

In particular embodiments, the torque on bit (TOB) can be calculated by measuring a rotational friction coefficient of the drill string within the wellbore 140 and estimating the downhole weight on the drill bit 134. Calculations can be done using finite element or difference methods or an analytical solution to the calculation.

In another embodiment, the sensor 146 can sense another physical parameter such as the relative rotational position of the drum 110 of the drawworks 108. The sensor 146 can be positioned either on, or adjacent to, the drum 110 such that as the drum 110 rotates about its central axis, the sensor 146 can sense and measure the relative rotational position of the drum 110. This measurement can be communicated to the logic element 148 which can precisely calculate the change in physical position thereof.

In yet another embodiment, the sensor 146 can sense the relative position of the top drive with respect to the substructure 102 of the drill rig 100. The sensor 146 can be positioned either on the top drive or on an adjacent component, such as, for example, on the derrick 104 or substructure 102, such that as the top drive translates vertically above the wellbore, the sensor 146 can sense and measure the relative position of the top drive. This measurement can be communicated to the logic element 148 which can precisely calculate the change in physical position thereof.

In a further embodiment, the sensor 146 can sense the relative longitudinal movement of a line engaged between the drill string 136 and the drawworks 108. The sensor 146 can be positioned along the line or can be positioned on an adjacent component, such as for example, on the derrick 104 or substructure 102, such that as the line translates longitudinally, the sensor 146 can sense and measure the relative position of the drill string 136 therefrom. This measurement can be communicated to the logic element 148 which can precisely calculate the change in physical position thereof.

Drill strings are often stopped or paused during drilling operations for sensing and measuring purposes, for adding a new pipe segment to the drill string 136, or to affect a pulsing motion on the drill bit 134. This stoppage can result in the drill string 136 becoming "stuck" within the wellbore. Specifically, when the drilling operation is stopped or paused, the drill string 136 can become adhered to, or absorbed into, at least a portion of the inner surface of the wellbore. This is particularly common during non-vertical drilling operations when a greater weight of the drill string rests against a finite surface of the wellbore.

After a drill string becomes "stuck" in a wellbore (i.e., the forces associated with movement of the drill string increase beyond relatively normal operating conditions), the forces required to overcome the static frictional regime to free the drill string are typically higher than the forces associated with continued relative movement of the drill string.

Referring again to FIG. 1, the force required to set the drill string in motion (i.e., the overshoot force as seen at line 6) is higher than the force required to keep the drill string in motion (the dynamic frictional force 4). In this regard, the friction coefficient, $\mu$, changes instantaneously, or nearly instantaneously, immediately prior to and during the transition from a static to dynamic frictional regime.

Typically, when left uncontrolled during the shift from the static regime 2 to the dynamic regime 4, the drill string 136 can overshoot. In other words, application of a force sufficient to break the static regime 2 can carry over to the dynamic regime 4, causing the drill string 136 to rapidly accelerate (e.g., greater than about 5 m/s$^2$, greater than 10 m/s$^2$, or even greater than about 15 m/s$^2$) and momentarily translate within the wellbore 140 at an elevated rate. This, in turn, can cause the drill bit 134 to rapidly compress against the bottom surface of the wellbore 140 at a rate exceeding the safety factor of the drill bit 134 and/or the drill string 136. This can damage the drill bit 134 and/or drill string 136. Damage resulting from the impact can require replacement of the drill bit 134 and/or drill string 136 resulting in down time and requiring the drill string 136 be tripped out, or cycled to the surface for repair—a process that can take several hours to complete.

To reduce the damage that can result as part of the shift from the static to dynamic regimes as seen in traditional drilling operations, the drill string 136 can be moved in a sequence of predetermined longitudinal increments, or pulses. Each pulse can be defined by a finite force or anticipated linear displacement of the drill string 136 that is less than the anticipated force or linear displacement required to break the static frictional regime. A combination of successive pulses, or the sequence of predetermined longitudinal incremental forces, can break the drill string 136 from the static regime while reducing overshoot.

In particular embodiments, the pulses can be controlled by the drawworks 108. Generally, after reaching a certain operating depth, the combined weight of the drill string (i.e., the weight of the combination of discrete pipe segments) is greater than necessary to affect vertical drilling. In this case, the drawworks 108 is effectively used to reduce the DWOB by supplying a tension to the drill string 136. This can prevent the application of excessive axial force to the drill bit 134.

For example, by engaging the brake 112 of the drawworks 108, the axial forces transmitted through the drill string 136 can be controlled. By pulsing the brake 112 of the drawworks 108, the weight of the drill string 136 allows the drill bit 134 to controllably impact the bottom of the wellbore. In other embodiments, the pulses can be controlled by a rack and pinion arrangement with or without a traction motor, or a piston assembly.

Traditional drilling operations attempt to maximize ROP by pulsing the draw works in predetermined rotational increments, rather than pulse the draw works so as to affect even incremental longitudinal movements. In such a manner, the force applied to the drill string 136 is even while the resulting longitudinal translation of the drill string 136 may not be even.

While this pulsing of the drill string 136 to affect even longitudinal force can reduce overshoot during the shift from the static and dynamic frictional regime, overshoot still occurs because the drilling system is monitoring force and not axial displacement. In other words, because the transition period from static to kinetic friction requires an overshoot force greater than the dynamic frictional regime, traditional drilling operations can introduce unnecessary force into the drilling operation, resulting in a sudden overshoot.

Figure 3A:
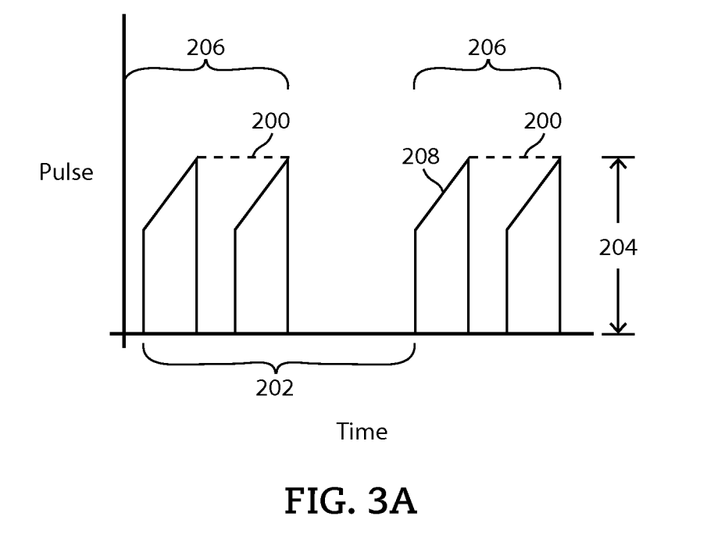
FIG. 3A includes a traditional pulse pattern as affected on a drill string.
Figure 3B:
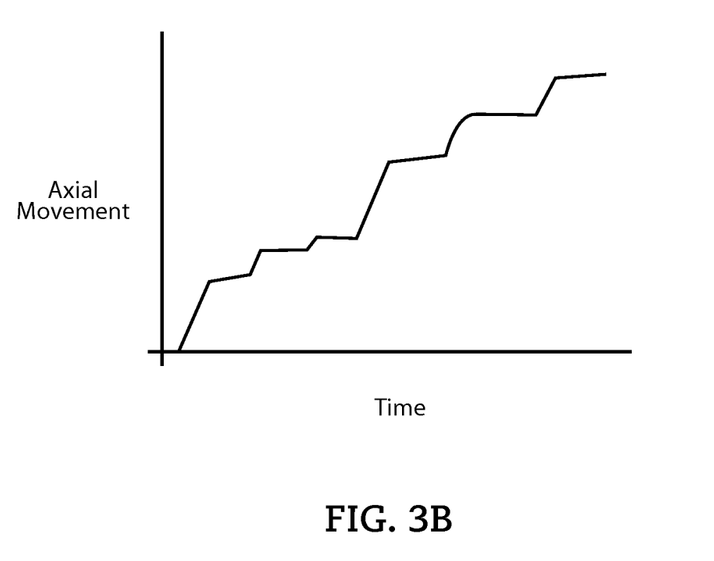
FIG. 3B includes a graph of axial movement of a drill string within a wellbore in response to the pulse pattern illustrated in FIG. 3A.

As shown in FIG. 3A and FIG. 3B, many traditional pulsing operations provide the drill string with uniform pulses 200. A uniform pulse signal 200 is sent to the brake which facilitates a uniform braking pattern. The uniform braking pattern in turn affects a uniform pulsing pattern of the drill string. This uniform pulsing pattern does not account for dynamic changes to the geology of the wellbore or the changing conditions encountered during drilling. Therefore, these even pulses 200 can result in uneven longitudinal movements of the drill string, as seen in FIG. 3B. This can result in large overshoot as the drill string breaks out of the static frictional regime.

The uniform pulse signal supplied to the brake in traditional drilling operations can have several characteristics, such as, for example, a fixed pulse period 302, a fixed amplitude 204, a fixed duty cycle 206, and/or a fixed slope 208. By altering any one of these characteristics, either alone or in combination, the pulse signal supplied to the brake can be adjusted. However, the adjustment made to the pulse signal is not affected by sensing of a physical parameter of the drill string (i.e., not closed loop).

This traditional pulsing is uniform regardless of downhole activity. Thus, traditional drilling operations cannot precisely respond to or correct for the overshoot caused by the shift from the static to dynamic regimes.

Figure 3C:
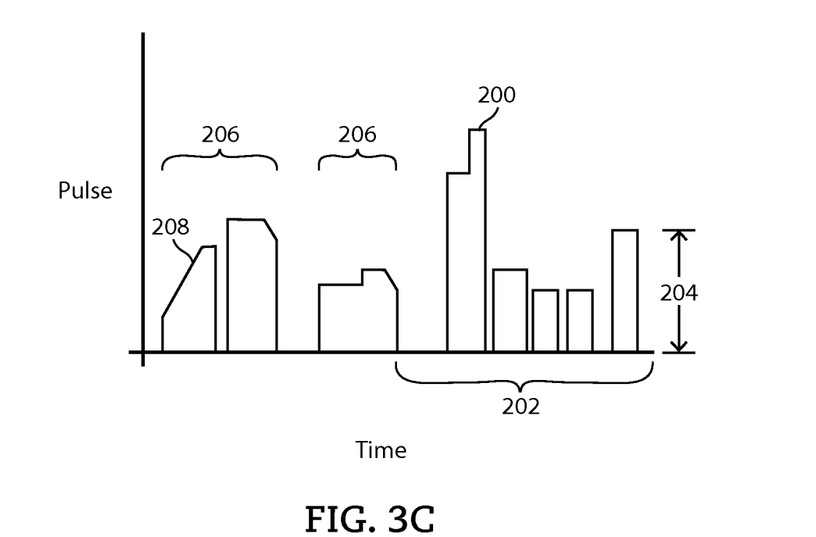
FIG. 3C includes a graph of a pulse pattern in accordance with an embodiment herein.
Figure 3D:
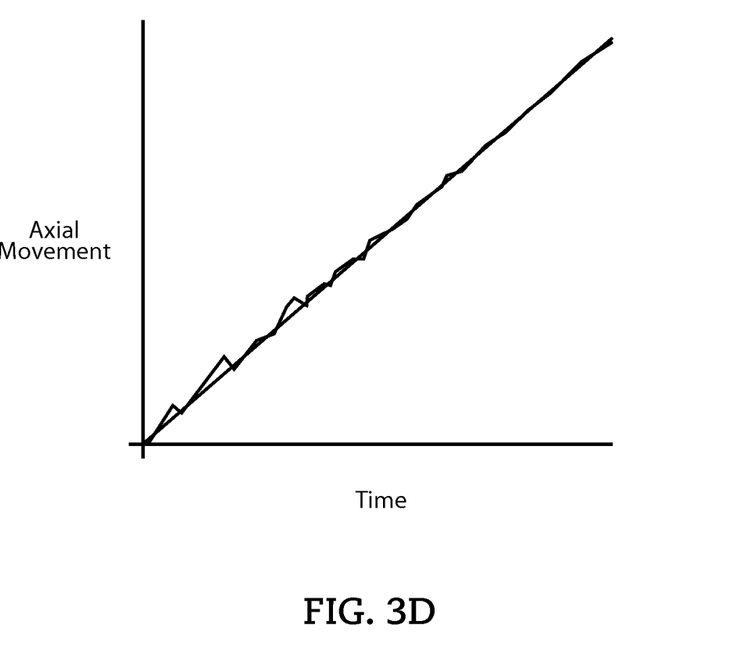
FIG. 3D includes a graph of axial movement of a drill string within a wellbore in response to the pulse pattern illustrated in FIG. 3C.

As a purely illustrative example, as shown in FIGS. 3C and 3D, the method and system of the present invention can be arranged to provide the drawworks with a series of uneven pulses 200 to affect an even axial movement of the drill string within the wellbore. The uneven pulses 200 are the result of the calculation as provided by the logic element in light of the measurable physical parameter as measured by the sensor. As the sensor measures the physical parameter (e.g., relative longitudinal position of the drill string at the surface), the logic element can precisely calculate the necessary longitudinal movement required to move the drill string and break the drill string out of the static friction regime.

Figure 4:
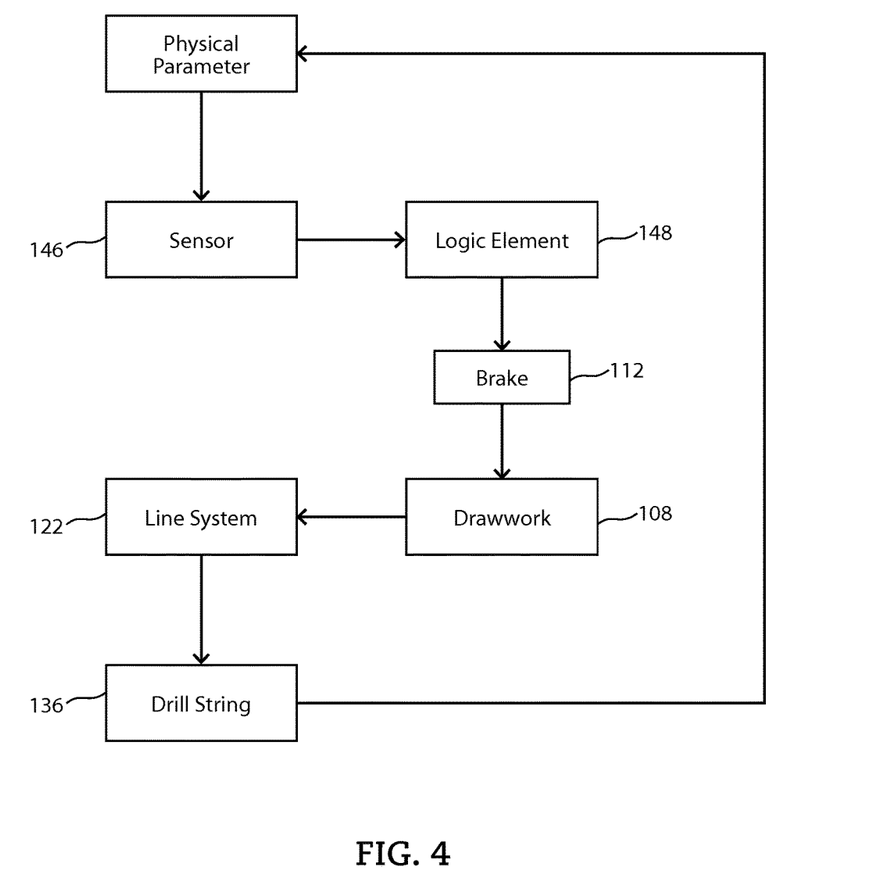
FIG. 4 includes a diagram of a system utilizing the presently disclosed invention to control a downhole or surface drilling device in accordance with an embodiment.

By closing the loop between the drill string and the drawworks, the effects of stiction can be better controlled and damage to the drilling operation can be greatly mitigated. As shown in FIG. 4, the sensor 146 can continuously measure a physical drilling parameter (e.g., DWOB) associated with drilling and communicate that physical parameter to the logic element 148.

The logic element 148 can perform a calculation using the measured physical drilling parameter to determine the force needed to maintain a desired physical parameter. The logic element 148 can then convert the force analysis into a pulse signal which can be communicated with the brake 112 of the drawworks 108. The drawworks 108 can in turn respond to the pulse signal and provide a braking force to the line system 122, which can affect axial movement of the drill string within the wellbore.

Using the present invention, it is possible to better control the ratio of $PP_1:PP_2$.

In particular embodiments, the values obtained for $PP_1$ and $PP_2$ may be adjusted by a drilling operator as suitable for the geological formation being drilled. It should be understood that as the relationship between $PP_1$ and $PP_2$ moves away from a 1:1 ratio, the drill string 1 will longitudinally translate within the wellbore at an increasing rate. A drilling operation with a high ROP will have a $PP_1:PP_2$ ratio, such as, for example, 1:1.15 or even 1:1.20.

Prior to, and during the shift from a static friction regime to a dynamic friction regime (i.e., the breakout period), the ratio of $PP_1:PP_2$ will be at or near 1:1. By selecting a ratio of $PP_1:PP_2$ that is close to 1:1, an operator can affect a gradual breakout from the static friction regime that prevents drill string 136 overshoot.

For example, because the ratio of $PP_1:PP_2$ is indicative of relative perceptible physical movement of the drill string 136, a low $PP_1:PP_2$ ratio indicates a low relative physical movement of the drill string 136. By maintaining a low value for $PP_1:PP_2$ after the breakout condition occurs and motion is achieved, the drill string 136 will have a reduced overshoot distance.

FIG. 3D illustrates the movement of the drill string within the wellbore as affected by the pulsing pattern shown in FIG. 3C. Because the system is closed loop (i.e., the braking is responsive to a measurable physical parameter), the present invention can affect even longitudinal movement of the drill string using uneven pulse patterns 200. In such a manner, the drill string can be operated with minimal overshoot. This can permit a smoother drilling pattern and reduce unwanted acute impact between the drill bit and the bottom of the wellbore.

In particular embodiments, the logic element can control the pulse pattern 200, for example, by changing any one or more of the pulse period 302, the amplitude 204, the duty cycle 206, or the slope 208 of the pulses. The changes can be affected individually between the pulses (i.e., a pulse-by-pulse basis) as deemed necessary by the calculation performed by the logic element.

The embodiments herein are directed to a method and system for mitigating the effects of stiction and the like as encountered by a drill string during drilling operations. The method and system herein can utilize a closed loop feedback to actively measure and correct for physical parameters encountered during drilling operations. Notably, in particular embodiments, the present method and system can utilize a combination of features, including but not limited to, particular components such as a derrick, a hoisting system, a line system, and a rotating system, mechanical properties, and certain measurable characteristics that represent a departure from the state-of-the-art.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Item 1. A system for use in subterranean operations comprising:
   a drill string positioned within a wellbore;
   a sensor adapted to sense a physical parameter in relation to the drill string and generate a signal representing the physical parameter; and
   a control member adapted to affect subterranean longitudinal movement of the drill string in a predetermined longitudinal sequence of increments within the wellbore in response to the signal.

Item 2. The system according to item 1, wherein the system is a closed-loop system.

Item 3. The system according to any one of the preceding items, wherein the physical parameter is a parameter selected from at least one of the following:
   (i) position of the drill string; or
   (ii) longitudinal movement of a line engaged between the drill string and the control member; or
   (iii) position of a top drive, the top drive engaged to the drill string; or
   (iv) relative position of the control member.

Item 4. The system according to any one of the preceding items, wherein the system is adapted to longitudinally move the drill string within the wellbore to affect a second physical parameter.

Item 5. The system according to item 4, wherein the physical parameter has a value, $PP_1$, wherein the second physical parameter has a value, $PP_2$, and wherein $PP_1$ is no less than about 0.70 $PP_2$, no less than about 0.75 $PP_2$, no less than about 0.80 $PP_2$, no less than about 0.85 $PP_2$, no less than about 0.90 $PP_2$, no less than about 0.95 $PP_2$, no less than about 0.96 $PP_2$, no less than about 0.97 $PP_2$, no less than about 0.98 $PP_2$, no less than about 0.99 $PP_2$.

Item 6. The system according to item 5, wherein $PP_1$ is no greater than about 1.30 $PP_2$, no greater than about 1.25 $PP_2$, no greater than about 1.20 $PP_2$, no greater than about 1.15 $PP_2$, no greater than about 1.10 $PP_2$, no greater than about 1.05 $PP_2$, no greater than about 1.04 $PP_2$, no greater than about 1.03 $PP_2$, no greater than about 1.02 $PP_2$, no greater than about 1.01 $PP_2$.

Item 7. The system according to any one of the preceding items, wherein the drill string is supported at least in part by a connecting member extending from the drill string to the control member.

Item 8. The system according to item 7, wherein the drill string is directly engaged to control member.

Item 9. The system according to any one of the preceding items, wherein the control member comprises a draw works, and wherein the draw works comprises a rotatable drum and a brake, and wherein the line is engaged with the drum.

Item 10. The system according to item 9, wherein the brake is connected to the drum such that application of a force on the brake is adapted to restrict rotation of the drum.

Item 11. The system according to any one of items 1-8, wherein the control member comprises a motor.

Item 12. The system according to any one of items 1-8, wherein the control member comprises a rack and pinion system.

Item 13. The system according to any one of the preceding items, further comprising a logic element.

Item 14. The system according to item 13, wherein the logic element is adapted to receive the physical parameter from the sensor, and wherein the logic element is adapted to perform a calculation and generate a control signal.

Item 15. The system according to item 13, wherein the logic element is adapted to communicate the control signal to the control member, and wherein the control member is adapted to affect the physical parameter in response to the control signal.

Item 16. The system according to any one of items 14 or 15, wherein the control signal is adapted to engage a resistive member of the control member.

Item 17. The system according to item 16, wherein the resistive member is engaged to affect predetermined incremental movement of the drill string within the wellbore.

Item 18. The system according to any one of items 16 or 17, wherein the resistive member comprises a brake.

Item 19. The system according to any one of items 16 or 17, wherein the resistive member comprises a motor.

Item 20. A method for use in subterranean operations comprising:
providing a control member adapted to affect subterranean movement of a drill string;
sensing a physical parameter of the drill string; and
affecting the control member to move the drill string in response to the physical parameter.

Item 21. The method according to item 20, wherein the physical parameter is a parameter selected from at least one of the following:
(i) vertical movement of a top drive; or
(ii) longitudinal movement of a line engaged between the drill string and the control member; or
(iii) relative position of the control member; or
(iv) relative position of a line engaged with the control member.

Item 22. The method according to any one of items 20 or 21, wherein sensing a physical parameter of the drill string occurs above ground.

Item 23. The method according to any one of items 20-22, further comprising:
measuring the sensed physical parameter;
calculating a response to the physical parameter;
generating a control signal in response to the calculated response; and
communicating the control signal to the control member.

Item 24. The method according to item 23, wherein the step of calculating a response to the physical parameter comprises:
communicating the measured physical parameter to a logic element; and
affecting a logic algorithm contained in the logic element.

Item 25. The method according to any one of items 23 or 24, further comprising: entering a user parameter into a user interface; and
dynamically adjusting the control signal in response to the user parameter.

Item 26. The method according to any one of items 20-25, wherein the control member comprises a draw works.

The embodiments provide a combination of features, which can be combined in various matters to describe and define a method and system of the embodiments. The description is not intended to set forth a hierarchy of features, but different features that can be combined in one or more manners to define the invention. In the foregoing, reference to specific embodiments and the connection of certain components is illustrative. It will be appreciated that reference to components as being coupled or connected is intended to disclose either direct connected between said components or indirect connection through one or more intervening components as will be appreciated to carry out the methods as discussed herein.

As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The disclosure is submitted with the understanding that it will not be used to interpret or limit the scope or meaning of the claims. In addition, in the foregoing disclosure, various features may be grouped together or described in a single embodiment for the purpose of streamlining the disclosure. This disclosure is not to be interpreted as reflecting an intention that the embodiments herein limit the features provided in the claims, and moreover, any of the features described herein can be combined together to describe the inventive subject matter. Still, inventive subject matter may be directed to less than all features of any of the disclosed embodiments.

What is claimed is:

1. A system for use in subterranean operations comprising:
a drill string positioned within a wellbore;
a sensor adapted to sense a physical parameter in relation to the drill string and generate a first signal representing the physical parameter;
a control system configured to receive the first signal and to identify a static friction condition of the drill string, the control system further configured to calculate a force required to overcome the static friction condition of the drill string, and to deliver a control signal comprising a combination of successive uneven pulses to a control member to move the drill string from the static friction condition to a dynamic friction condition; and
a control member adapted to receive the control signal and to affect subterranean longitudinal movement of the drill string in a predetermined longitudinal sequence of increments within the wellbore in response to the control signal.

2. The system according to claim 1, wherein the system is a closed-loop system.

3. The system according to claim 1, wherein the physical parameter is a parameter selected from at least one of the following:
position of the drill string; or
longitudinal movement of a line engaged between the drill string and the control member; or
position of a top drive, the top drive engaged to the drill string; or
relative position of the control member; or
a combination thereof.

4. The system according to claim 1, wherein the system is adapted to longitudinally move the drill string within the wellbore to affect a second physical parameter.

5. The system according to claim 1, wherein the drill string is supported at least in part by a connecting member extending from the drill string to the control member.

6. The system according to claim 1, wherein the control member comprises a draw works, wherein the draw works comprises a rotatable drum and a brake, and wherein a line is engaged with the rotatable drum and between the draw works and the drill string.

7. The system according to claim 6, wherein the brake is connected to the rotatable drum such that application of a force on the brake is adapted to restrict rotation of the rotatable drum.

8. The system according to claim 1, wherein the control system comprises a logic element.

9. The system according to claim 8, wherein the logic element is adapted to receive the first signal from the sensor, and wherein the logic element is adapted to perform a calculation and generate the control signal.

10. The system according to claim 8, wherein the logic element is adapted to communicate the control signal to the control member, and wherein the control member is adapted to affect the physical parameter in response to the control signal.

11. The system according to claim 10, wherein the control member is adapted to engage a resistive member based on the control signal.

12. The system according to claim 11, wherein the resistive member comprises a brake.

13. The system according to claim 11, wherein the resistive member comprises a motor.

14. The system according to claim 1, wherein the successive uneven pulses are defined by a pattern of at least two pulses having different amplitudes or frequencies with respect to each other.

15. A method for use in subterranean operations comprising:
   providing a control member adapted to affect subterranean movement of a drill string;
   sensing a physical parameter of the drill string; and
   affecting the control member to deliver a combination of successive uneven pulses to move the drill string from a static friction condition to a dynamic friction condition in response to the physical parameter.

16. The method according to claim 15, wherein the physical parameter is a parameter selected from at least one of the following:
   vertical movement of a top drive; or
   longitudinal movement of a line engaged between the drill string and the control member; or
   relative position of the control member; or
   relative position of a line engaged with the control member; or
   a combination thereof.

17. The method according to claim 15, wherein the step of sensing the physical parameter of the drill string occurs above ground.

18. The method according to claim 15, further comprising:
   measuring the sensed physical parameter;
   calculating a response to the physical parameter;
   generating a control signal in response to the calculated response; and
   communicating the control signal to the control member.

19. The method according to claim 18, wherein the step of calculating the response to the physical parameter comprises:
   communicating the measured physical parameter to a logic element; and
   affecting a logic algorithm contained in the logic element.

20. The method according to claim 19, further comprising:
   entering a user parameter into a user interface; and
   dynamically adjusting the control signal in response to the user parameter.

* * * * *